United States Patent
Sagisaka (10) Patent No.: US 8,078,380 B2
(45) Date of Patent: Dec. 13, 2011

(54) CONTROL DEVICE FOR VEHICLE AUTOMATIC RUNNING

(75) Inventor: Yasuo Sagisaka, Komaki (JP)

(73) Assignee: Denso Corporation, Kariya (JP)

( * ) Notice: Subject to any disclaimer, the term of this patent is extended or adjusted under 35 U.S.C. 154(b) by 950 days.

(21) Appl. No.: 11/543,870

(22) Filed: Oct. 6, 2006

(65) Prior Publication Data

US 2007/0083317 A1   Apr. 12, 2007

(30) Foreign Application Priority Data

Oct. 7, 2005   (JP) .................................. 2005-295247

(51) Int. Cl.
*B60K 31/00* (2006.01)
(52) U.S. Cl. ........... 701/93; 123/350; 123/376; 180/179
(58) Field of Classification Search .................... 701/93; 180/170; 123/349, 319, 376, 399, 350; 340/425.5; B60K 31/00
See application file for complete search history.

(56) References Cited

U.S. PATENT DOCUMENTS

| | | | |
|---|---|---|---|
| 5,638,277 A | 6/1997 | Nagai | |
| 5,695,020 A * | 12/1997 | Nishimura | 180/169 |
| 6,311,120 B1 * | 10/2001 | Asada | 701/96 |
| 7,233,854 B2 * | 6/2007 | Rayl et al. | 701/93 |
| 7,237,531 B2 * | 7/2007 | Atkinson | 123/399 |
| 7,284,535 B2 * | 10/2007 | Irihune et al. | 123/337 |
| 7,340,337 B2 * | 3/2008 | Katrak | 701/70 |
| 7,530,345 B1 * | 5/2009 | Plante et al. | 123/361 |
| 2001/0017036 A1 * | 8/2001 | Kawaguchi et al. | 62/133 |
| 2001/0025218 A1 * | 9/2001 | Shimada et al. | 701/86 |
| 2006/0006734 A1 * | 1/2006 | Tabata et al. | 303/3 |
| 2006/0130809 A1 * | 6/2006 | Wetor et al. | 123/376 |

FOREIGN PATENT DOCUMENTS

JP   09228867 A  *  9/1997

* cited by examiner

*Primary Examiner* — Tuan C To
(74) *Attorney, Agent, or Firm* — Nixon & Vanderhye P.C.

(57) ABSTRACT

An electronic throttle control system has a throttle valve to be operated by an electric motor, and an electronic control unit for calculating a target opening degree of the throttle valve depending on a first preset vehicle speed desired by a vehicle driver, so that a vehicle is controlled to automatically run at the preset vehicle speed. When an external module, for example, an ACC module, is added to the electronic throttle control system, and a second preset vehicle speed is inputted from the external module to the electronic control unit the electronic, the electronic control unit selects one of the first and second preset vehicle speeds, which is lower than the other. Then, the target opening degree of the throttle valve is calculated based on the selected preset vehicle speed.

1 Claim, 11 Drawing Sheets

CONTROL DEVICE FOR VEHICLE AUTOMATIC RUNNING

CROSS REFERENCE TO RELATED APPLICATION

This application is based on Japanese Patent Application No. 2005-295247 filed on Oct. 7, 2005, the disclosure of which is incorporated herein by reference.

FIELD OF THE INVENTION

The present invention relates to a control device for a vehicle automatic running, in which a vehicle speed is automatically controlled.

BACKGROUND OF THE INVENTION

A vehicle distance control device is known in the art as one of control devices for a vehicle automatic running, other than a control device for a vehicle constant speed running (which is generally called as a cruise control system). The control device for the vehicle constant speed running is such a system, in which a vehicle speed is controlled at a preset vehicle speed so that the vehicle runs at such a preset constant vehicle speed. In the system of this kind, an opening degree of a throttle valve is automatically controlled without an operation of an acceleration pedal by a vehicle driver, such that an actual vehicle speed detected by a vehicle speed sensor may coincide with the preset vehicle speed.

In the vehicle distance control device, for example, as disclosed in Japanese Patent Publication No. H6-229279, an electronic throttle control system is controlled. In the electronic throttle control system, a vehicle distance toward a front vehicle as well as a vehicle speed of the front vehicle is detected by a sensor (e.g. a camera) mounted on a vehicle, and a demand vehicle acceleration (a target acceleration) for the vehicle is calculated based on the information, such as the vehicle distance, a speed difference between its own vehicle and the front vehicle, and the vehicle speed of its own vehicle. Then, a target opening value of a throttle valve is calculated based on the above-calculated demand vehicle acceleration, a position of a transmission gear (a position of a shift lever), and the vehicle speed of its own vehicle.

A number of vehicles, in which the control device for the vehicle constant speed running is mounted as a standard equipment, is increasing, because the control device for the vehicle constant speed running can be manufactured at a low cost and formed as a simple structure, for example, a structure having a speed setting switch. In addition, since a control logic for the control device for the vehicle constant speed running is not complicated, a function for the vehicle constant speed running control is often incorporated into an electronic control unit (ECU) for controlling the electronic throttle control system.

On the other hand, there are not many vehicles in which the vehicle distance control device is mounted, because such device is still expensive as a result that the control device needs the camera for detecting the vehicle distance to the front vehicle and the vehicle speed of the front vehicle, and so on. Accordingly, the vehicle distance control device is mounted in the vehicle as an optional equipment, or mounted in high-grade vehicles as the standard equipment. In addition, since a control logic for the vehicle distance control device is more complicated than that of the vehicle constant speed running control, a function for the vehicle distance control is generally formed as an external module, separately from the ECU for the electronic throttle control system.

In such a case, it is necessary to newly develop a system, so that the ECU of the electronic throttle control system may read-in a control signal from the external module, and converts the control signal into the target opening value of the throttle valve.

There are other external modules for the vehicle, other than the external module for the vehicle distance control, such as TRC (a traction control system), ABS (an anti-block braking system), and so on. In the case that those external modules are mounted in the vehicle, the same problem must be solved, namely the ECU for the electronic throttle control system should be modified to read-in control signals from those external modules and to convert the control signals into the target opening value of the throttle valve.

SUMMARY OF THE INVENTION

The present invention is made in view of the foregoing problems, and has an object to provide a control device for a vehicle automatic running, in which external modules can be easily mounted (easily added to an electronic throttle control system) and manufactured at a low cost.

According to one of the features of the present invention, a control device for a vehicle automatic running control has an electronic throttle control system for a vehicle.

The electronic throttle control system comprises; a vehicle speed sensor for detecting an actual running speed of the vehicle; a vehicle speed setting switch for setting a first preset vehicle speed; an electrical driving device for operating a throttle valve; and an electronic control unit for controlling an opening degree of the throttle valve by operating the electrical driving device in accordance with a signal from the vehicle speed setting switch, so that the vehicle runs at the first preset vehicle speed set by a vehicle driver.

The control device for the vehicle automatic running control has an external module for outputting a signal for a second preset vehicle speed depending on a vehicle running condition (e.g. a vehicle distance to a front vehicle), and the electronic control unit further comprises; a speed selecting portion for selecting one of the first and second preset vehicle speeds, which is smaller than the other; a calculating portion for calculating a demand engine torque based on the preset vehicle speed selected at the speed selecting portion as well as the actual running speed of the vehicle; and a calculation portion for calculating a target opening degree of the throttle valve based on the demand engine torque, so that the throttle valve is actuated to move to a position corresponding to the target opening degree.

According to another features of the present invention, a control device for a vehicle automatic running control has an electronic throttle control system for a vehicle.

The electronic throttle control system comprises; an electrical driving device for operating a throttle valve; and an electronic control unit for controlling an opening degree of the throttle valve by operating the electrical driving device in accordance with a signal from an acceleration pedal sensor, so that the vehicle runs at a speed desired by a vehicle driver.

The control device further comprises an external module for outputting a signal for an automatic vehicle running control, wherein the signal is related to one of the following information;
  a preset vehicle speed,
  a preset vehicle distance to a front vehicle,
  a preset time for the vehicle distance, and
  a preset vehicle acceleration.

The electronic control unit further comprises; an input processing portion for determining which information is inputted from the external module to the electronic control unit; a calculating portion for calculating a demand engine torque based on the inputted information to the electronic control unit; and a calculating portion for calculating a target opening degree of the throttle valve based on the demand engine torque, so that the throttle valve is actuated to move to a position corresponding to the target opening degree.

BRIEF DESCRIPTION OF THE DRAWINGS

The above and other objects, features and advantages of the present invention will become more apparent from the following detailed description made with reference to the accompanying drawings. In the drawing.

DETAILED DESCRIPTION OF THE PREFERRED EMBODIMENTS

First Embodiment

Figure 1:
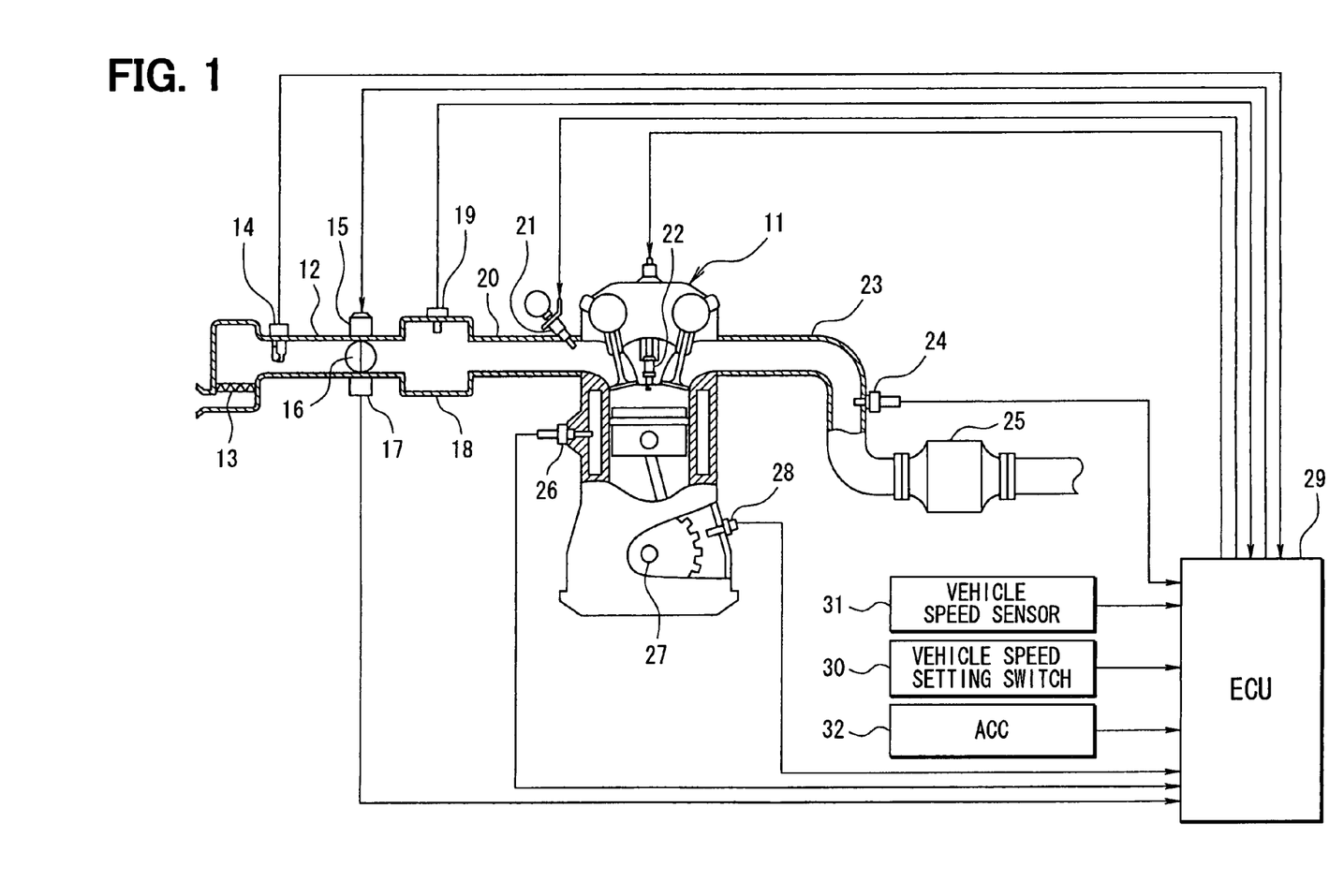
FIG. 1 is a schematic view showing an entire structure of an engine control system according to a first embodiment of the present invention.
Figure 2:
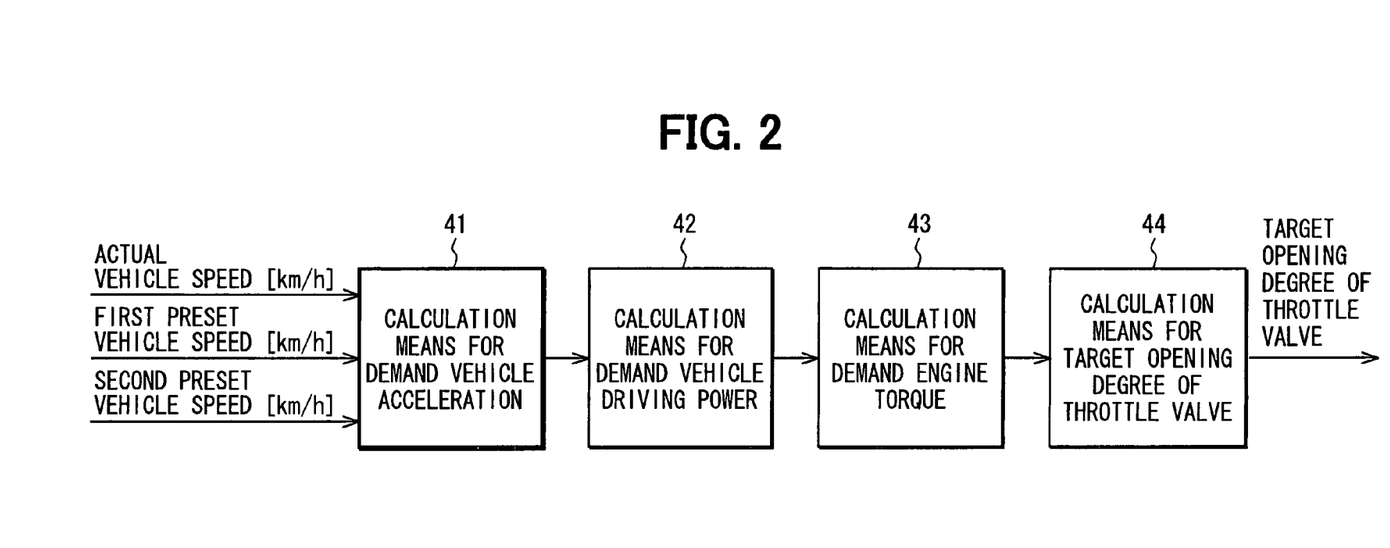
FIG. 2 is a block diagram showing a function of control device for a vehicle automatic running according to the first embodiment.

A first embodiment of the present invention will be explained with reference to FIGS. 1 to 3.

A system structure for an engine control system will be at first explained with reference to FIG. 1. An air cleaner 13 is provided at an upstream end of an intake pipe 12 for an internal combustion engine 11. An air-flow meter 14 is provided at a downstream side of the air cleaner 13, for detecting an amount of intake air. A throttle valve 16 and a sensor 17 are provided at a downstream side of the air-flow meter 14, wherein the throttle valve 16 is operated by a motor 15 so that an opening degree thereof is adjusted, and the sensor 17 detects the opening degree of the throttle valve 16.

A surge tank 18 is provided at a downstream side of the throttle valve 16. A sensor 19 is provided at the surge tank 18 for detecting an intake pipe pressure. Multiple intake manifolds 20 are connected to the surge tank 18 for supplying the intake air into respective cylinders of the engine 11. Multiple fuel injection valves 21 are attached to the intake manifolds 20 adjacent to respective intake ports, for injecting fuel into the intake manifolds 20. Multiple spark plugs 22 are mounted to respective cylinder heads of the engine 11, so that air-fuel mixture in the respective cylinders is ignited by spark discharge by the respective spark plugs 22.

A gas sensor 24 (an air-fuel ratio sensor, an oxygen sensor) is provided at an exhaust pipe 23 of the engine 11 for detecting air-fuel ratio of the exhausted gas or rich/lean condition of the exhausted gas. A catalyst 25, such as a three way catalyst, is provided at a downstream side of the gas sensor 24 for purifying the exhausted gas.

A temperature sensor 26 and a crank angle sensor 28 are provided at a cylinder block of the engine 11, wherein the temperature sensor 26 detects temperature of engine cooling water, and the crank angle sensor 28 outputs a crank angle signal (a pulse signal) for respective rotation of a predetermined crank angle for a crank shaft 27 of the engine 11. A crank angle and an engine rotational speed are detected based on the crank angle signal from the sensor 28.

Output signals from the above mentioned sensors are inputted to an engine control circuit (ECU) 29, which comprises a microcomputer for performing various engine control programs memorized in a memory device (ROM) installed in the microcomputer, so that a fuel injection amount by the fuel injection valve 21 as well as an ignition timing for the spark plug 22 is controlled in accordance with operational condition of the engine 11.

The ECU 29 carries out a constant speed running control (a cruise control) at a preset vehicle speed, when a vehicle driver operates, during a vehicle running, a vehicle speed setting switch 30 for the constant speed running control to set the vehicle speed at his desired speed (a first preset vehicle speed). The ECU 29 calculates a demand vehicle acceleration and controls the opening degree of the throttle valve 16, such that an actual vehicle speed detected by a vehicle speed sensor 31 reaches the first preset vehicle speed.

In this embodiment, an external module 32, for example an ACC module (Adaptive Cruise Control: a vehicle distance control), is further connected to the ECU 29, wherein the external module 32 outputs a signal for a second preset vehicle speed. A vehicle distance to a front vehicle, as well as a vehicle speed of the front vehicle is detected by a sensing device, such as a camera, mounted in the vehicle of the driver, more exactly, the vehicle distance as well as the vehicle speed of the front vehicle is calculated by the module 32 based on detected signals from the sensing device. The module 32 further calculates, based on the vehicle distance and the vehicle speed of the front vehicle, the second preset vehicle speed, at which the vehicle of the driver may keep an appropriate vehicle distance to the front vehicle and enable a safe automatic running of the vehicle. When the signal for the second preset vehicle speed is inputted to the ECU 29 from the module 32 during the constant speed running of the vehicle, the first preset vehicle speed set by the vehicle speed setting switch 30 and the second preset vehicle speed inputted from the ACC module 32 are compared with each other, and the one of the preset vehicle speeds which is lower than the other is selected. Then, a demand vehicle acceleration is calculated and the opening degree of the throttle valve 16 is controlled, in order that a difference between the selected vehicle speed and the actual vehicle speed is minimized. As above, the automatic running of the vehicle is carried out at the selected preset vehicle speed.

Another external module other than the ACC module 32, for example, a module for TRC (Traction Control System), a module for ABS (Anti-skid Braking System), and so on, may be alternatively connected to the ECU 29, so that the second preset vehicle speed is inputted to the ECU 29 instead of the ACC module 32. The following explanation will be made for the case in which the ACC module 32 is provided.

More detailed explanation for the vehicle automatic running control (the constant vehicle speed control and the vehicle distance control) according to the first embodiment will be made with reference to FIG. 2. FIG. 2 is a block diagram showing a function of the vehicle automatic running control carried out by the ECU 29. The function of the vehicle automatic running control is carried out by a calculation means 41 for a demand vehicle acceleration, a calculation means 42 for a demand vehicle driving power, a calculation means 43 for a demand engine torque, and a calculation means 44 for a target opening degree of the throttle valve.

Figure 3:
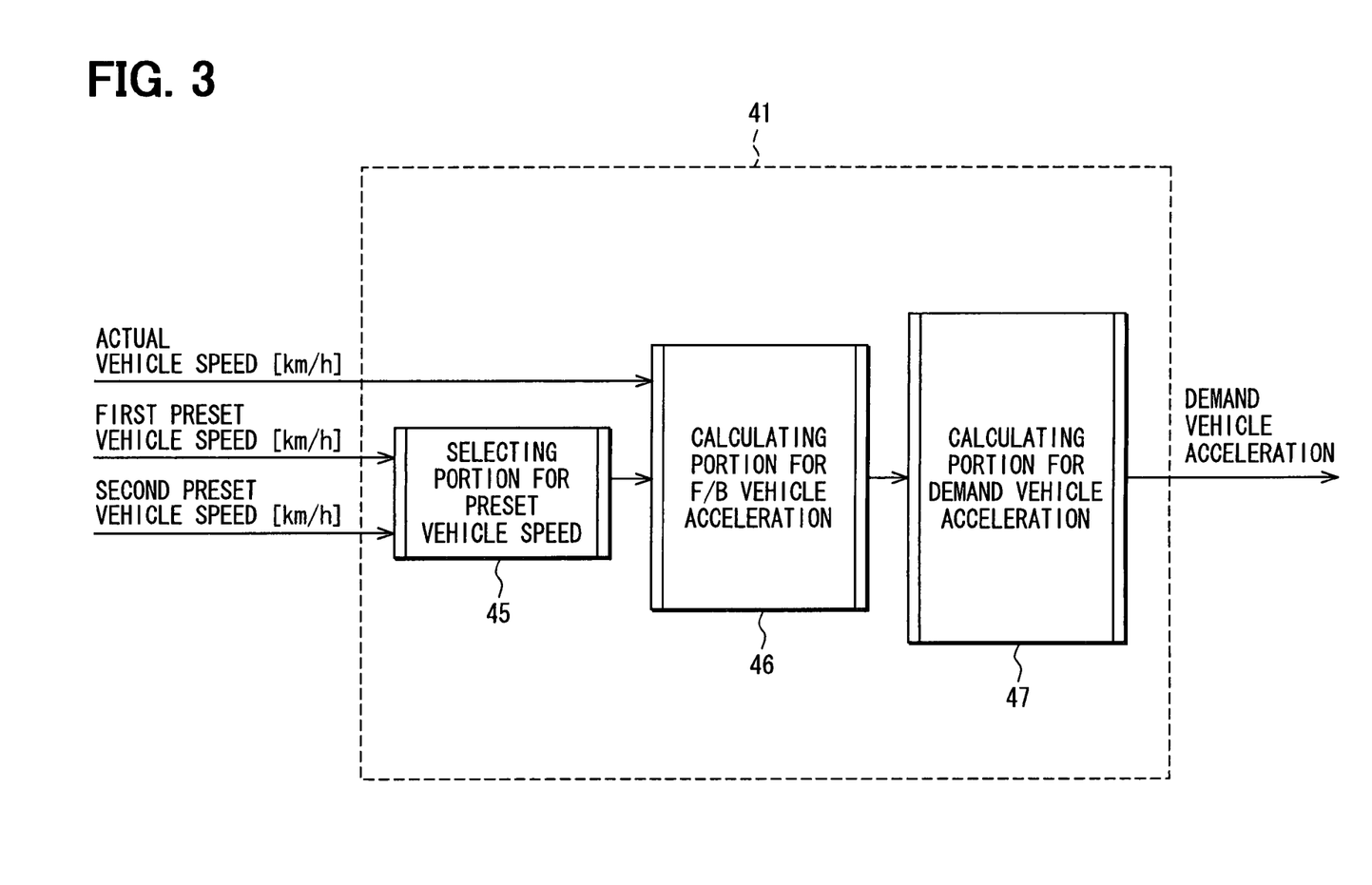
FIG. 3 is a block diagram showing a function for calculating a demand vehicle acceleration according to the first embodiment.

As shown in FIG. 3, the calculation means 41 for the demand vehicle acceleration has a selecting portion 45 for the preset vehicle speed, a calculating portion 46 for a feed-back vehicle acceleration, and a calculating portion 47 for the demand vehicle acceleration.

The selecting portion 45 for the preset vehicle speed compares the first preset vehicle speed set by the vehicle speed setting switch 30 with the second preset vehicle speed inputted from the ACC module 32, and selects one of the preset vehicle speed which is lower than the other. This is for the purpose of keeping a safer running of the vehicle. The calculating portion 46 for the feed-back vehicle acceleration calculates a feed-back correction amount for correcting a vehicle acceleration in a feed-back control in order that the difference between the actual vehicle speed detected by the vehicle speed sensor 31 and the selected vehicle speed selected at the selecting portion 45 will be minimized. The calculating portion 47 for the demand vehicle acceleration calculates the demand vehicle acceleration based on the feed-back correction amount calculated by the calculating portion 46.

The demand vehicle acceleration calculated by the calculation means 41 is inputted to the calculation means 42, and converted into the demand vehicle driving power. In addition to the function for calculating the demand vehicle driving power for the automatic vehicle running, the calculation means 42 has another function for calculating a demand vehicle driving power for a manually operated vehicle running. Namely, the calculation means 42 receives a signal of an opening degree of an acceleration pedal from an acceleration sensor (not shown), and calculates the demand vehicle driving power for the manually operated vehicle running based on the opening degree of the acceleration pedal. Accordingly, the calculation means 42 also calculates the demand vehicle driving power for the manually operated vehicle running, based on the opening degree of the acceleration pedal operated by the vehicle driver.

The demand vehicle driving power calculated by the calculation means 42 is inputted to the calculation means 43, at which it is converted into the demand engine torque.

The calculation means 44 calculates the target opening degree of the throttle valve based on the demand engine torque calculated at the calculation means 43, and outputs a control signal to a driving circuit (not shown) for the motor 15 of the electronic throttle control system. As a result, an actual opening degree of the throttle valve 16 is controlled by the motor 15 to move to a position corresponding to the target opening degree, and the vehicle is thereby automatically operated to run at the preset vehicle speed selected at the selecting portion 45.

According to the above explained first embodiment, the selecting portion 45 of the calculation means 41 selects one of the preset vehicle speeds, which is lower than the other, between the first preset vehicle speed set by the vehicle driver via the vehicle speed setting switch 30 and the second vehicle speed outputted from the ACC module 32, and the calculation means 41 calculates the demand vehicle acceleration based on the selected vehicle speed in order to control the opening degree of the throttle valve. Accordingly, the safety to the preset vehicle speed can be maintained, and at the same time the specifications of the ACC module 32 can be applied to the control specifications of the ECU 29. The ACC module 32 can be, thus, easily added to the electronic throttle control system, while satisfying a requirement for the cost reduction.

Any other external modules, other than the ACC module 32, can be also added to the electronic throttle control system, so long as the other external module outputs the second preset vehicle speed. This is advantageous in that specifications for connection between the ECU 29 and the external modules can be standardized.

Second Embodiment

A second embodiment of the present invention will be explained with reference to FIGS. 4 and 5. A system structure for an engine control system of the second embodiment is the same to that of the first embodiment (FIG. 1).

Figure 4:
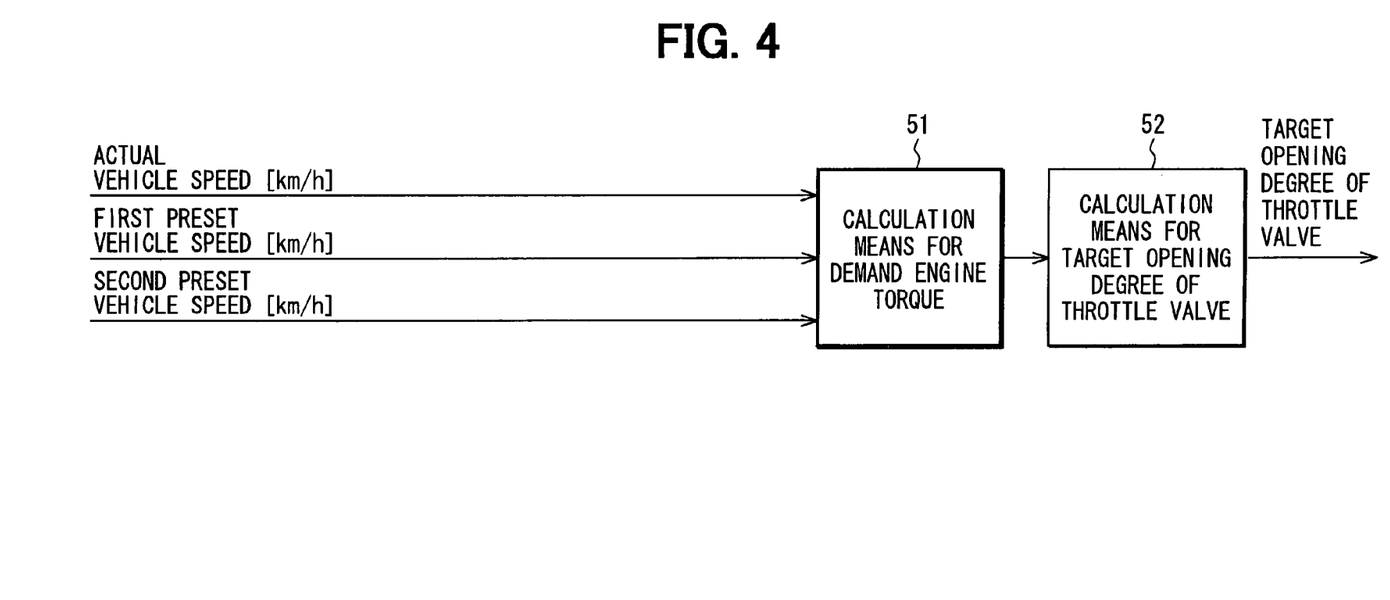
FIG. 4 is a block diagram showing a function of control device for a vehicle automatic running according to a second embodiment.

As shown in FIG. 4, the function of the vehicle automatic running control to be performed by the ECU 29 is carried out by a calculation means 51 for a demand engine torque and a calculation means 52 for a target opening degree of the throttle valve.

In addition to the function 51a (shown in FIG. 5) of the calculation means 51 for calculating the demand engine torque for the automatic running control of the vehicle, the calculation means 51 has another function for calculating a demand engine torque for a manually operated vehicle running, as in a similar manner to the first embodiment. Namely, the calculation means 51 receives a signal of an opening degree of an acceleration pedal from an acceleration sensor (not shown), and calculates the demand engine torque for the manually operated vehicle running based on the opening degree of the acceleration pedal. Accordingly, the calculation means 51 also calculates the demand engine torque for the manually operated vehicle running, based on the opening degree of the acceleration pedal operated by the vehicle driver.

Figure 5:
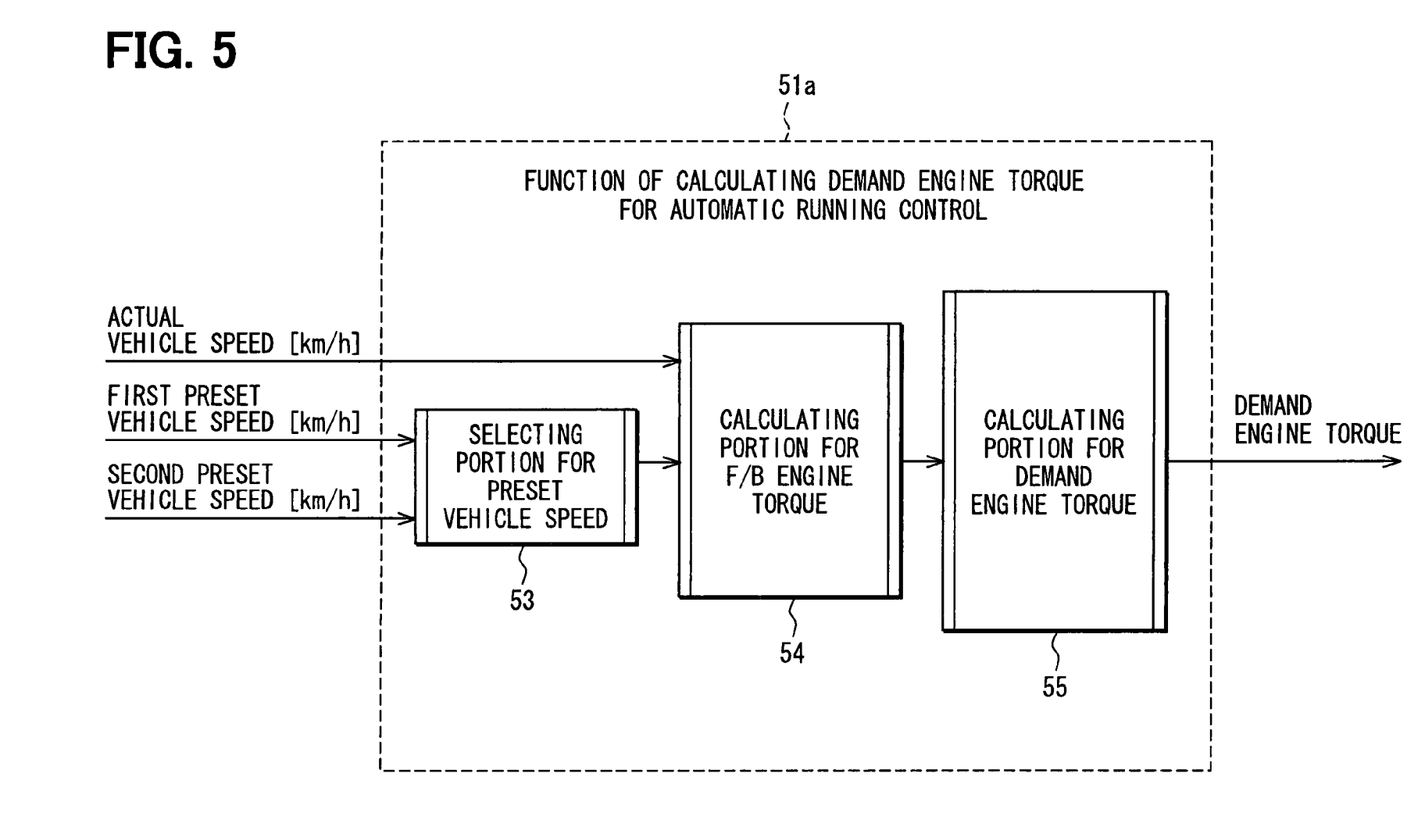
FIG. 5 is a block diagram showing a function for calculating a demand engine torque according to the second embodiment.

As shown in FIG. 5, the function 51a of calculating the demand engine torque for the automatic running control is carried out by a selecting portion 53 for a preset vehicle speed, a calculating portion 54 for a feed-back engine torque, and a calculating portion 55 for the demand engine torque.

The selecting portion 53 for the preset vehicle speed compares the first preset vehicle speed set by the vehicle speed setting switch 30 with the second preset vehicle speed inputted from the ACC module 32, and selects one of the preset vehicle speed which is lower than the other. The calculating portion 54 for the feed-back engine torque calculates a feed-back correction amount for correcting an engine torque in a feed-back control in order that the difference between the actual vehicle speed detected by the vehicle speed sensor 31 and the selected vehicle speed selected at the selecting portion 53 will be minimized. The calculating portion 55 for the demand engine torque calculates the demand engine torque based on the feed-back correction amount calculated by the calculating portion 54.

The calculation means 52 calculates the target opening degree of the throttle valve based on the demand engine torque calculated at the calculation means 51, and outputs a control signal to a driving circuit (not shown) for the motor 15 of the electronic throttle control system. An actual opening degree of the throttle valve 16 is controlled by the motor 15 to move to a position corresponding to the target opening degree, and the vehicle is thereby automatically operated to run at the preset vehicle speed selected at the selecting portion 53.

According to the above explained second embodiment, the selecting portion 53 of the calculation means 51 selects one of the preset vehicle speeds, which is lower than the other, between the first preset vehicle speed set by the vehicle driver via the vehicle speed setting switch 30 and the second vehicle speed outputted from the ACC module 32, and the calculation means 51 calculates the demand engine torque based on the selected vehicle speed in order to control the opening degree of the throttle valve. Accordingly, the same effect to the first embodiment can be obtained in the second embodiment.

Third Embodiment

A third embodiment of the present invention will be explained with reference to FIGS. 6 and 7. A system structure for an engine control system of the third embodiment is the same to that of the first embodiment (FIG. 1).

Figure 6:
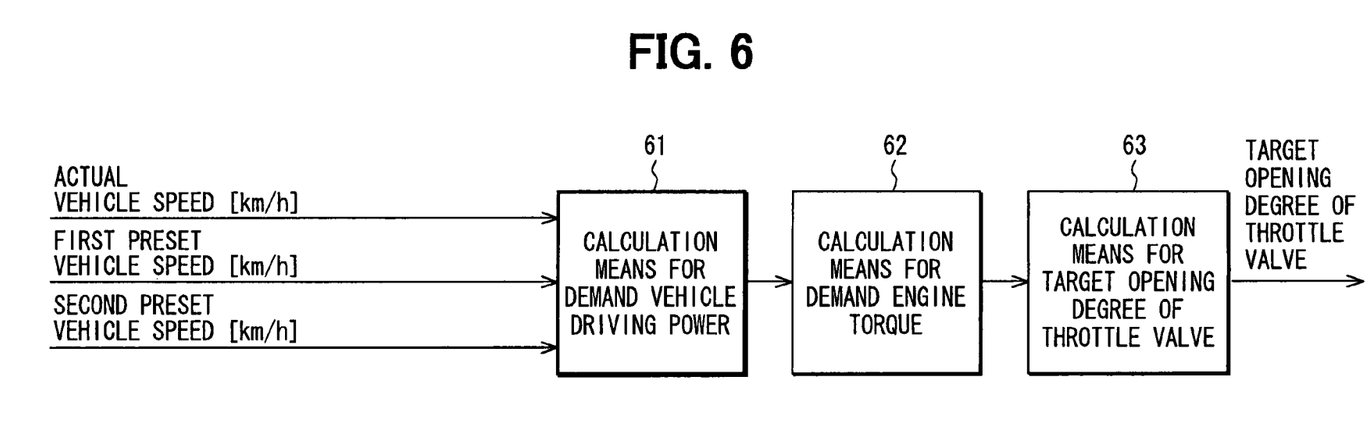
FIG. 6 is a block diagram showing a function of control device for a vehicle automatic running according to a third embodiment.

As shown in FIG. 6, the function of the vehicle automatic running control to be performed by the ECU 29 is carried out by a calculation means 61 for a demand vehicle driving power, a calculation means 62 for a demand engine torque, and a calculation means 63 for a target opening degree of the throttle valve.

In addition to the function 61a (shown in FIG. 7) of the calculation means 61 for calculating the demand vehicle driving power for the automatic running control of the vehicle, the calculation means 61 has another function for calculating a demand vehicle driving power for a manually operated vehicle running, as in a similar manner to the first embodiment. Namely, the calculation means 61 receives a signal of an opening degree of an acceleration pedal from an acceleration sensor (not shown), and calculates the demand vehicle driving power for the manually operated vehicle running based on the opening degree of the acceleration pedal. Accordingly, the calculation means 61 also calculates the demand vehicle driving power for the manually operated vehicle running, based on the opening degree of the acceleration pedal operated by the vehicle driver.

Figure 7:
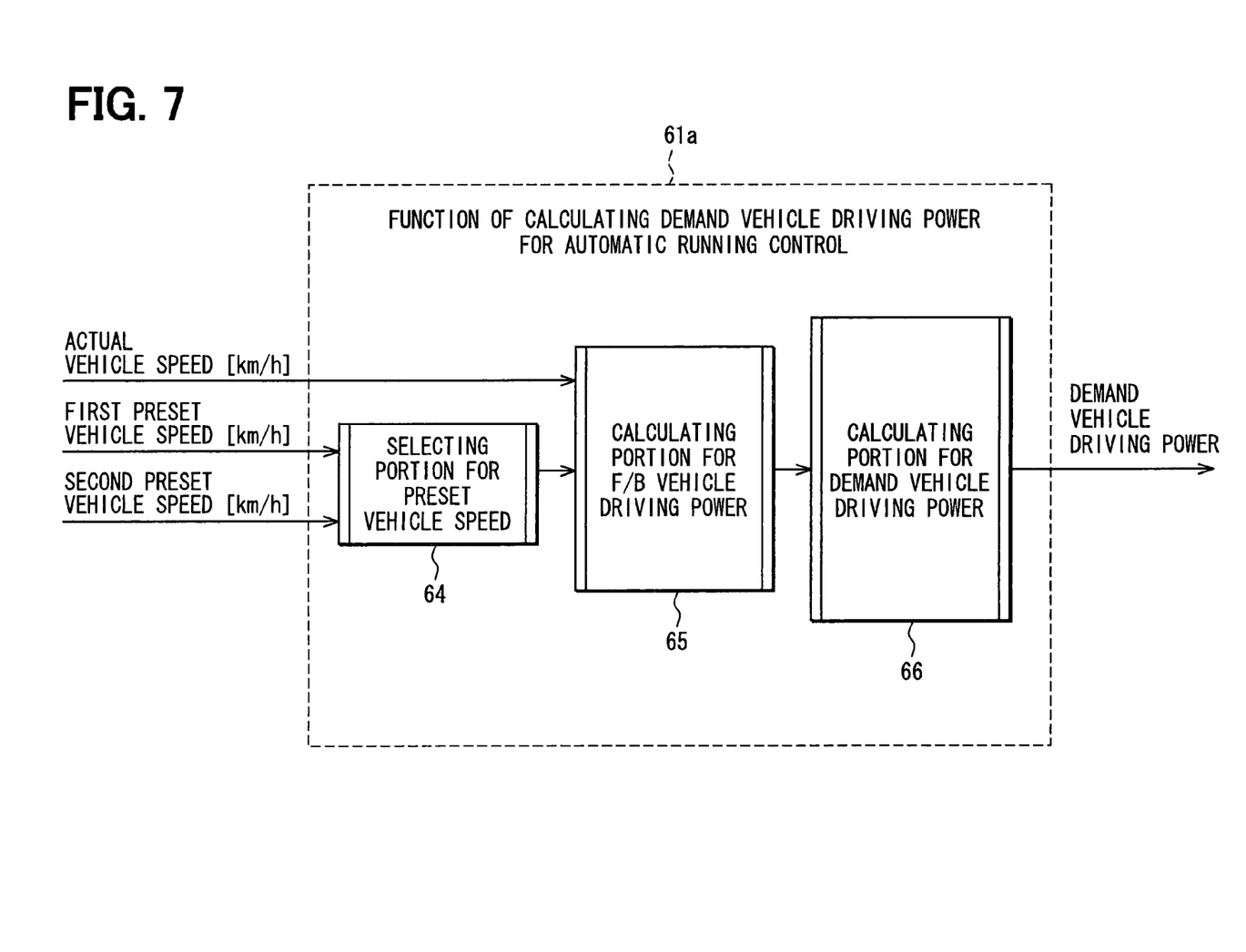
FIG. 7 is a block diagram showing a function for calculating a demand vehicle driving power according to the third embodiment.

As shown in FIG. 7, the function 61a of calculating the demand vehicle driving power for the automatic running control is carried out by a selecting portion 64 for a preset vehicle speed, a calculating portion 65 for a feed-back vehicle driving power, and a calculating portion 66 for the demand vehicle driving power.

The selecting portion 64 for the preset vehicle speed compares the first preset vehicle speed set by the vehicle speed setting switch 30 with the second preset vehicle speed inputted from the ACC module 32, and selects one of the preset vehicle speed which is lower than the other. The calculating portion 65 for the feed-back vehicle driving power calculates a feed-back correction amount for correcting a vehicle driving power in a feed-back control in order that the difference between the actual vehicle speed detected by the vehicle speed sensor 31 and the selected vehicle speed selected at the selecting portion 64 will be minimized. The calculating portion 66 for the demand vehicle driving power calculates the demand vehicle driving power based on the feed-back correction amount calculated by the calculating portion 65.

The demand vehicle driving power calculated by the calculation means 61 is inputted to the calculation means 62, at which it is converted into the demand engine torque.

The calculation means 63 calculates the target opening degree of the throttle valve based on the demand engine torque calculated at the calculation means 62, and outputs a control signal to a driving circuit (not shown) for the motor 15 of the electronic throttle control system. As a result, an actual opening degree of the throttle valve 16 is controlled by the motor 15 to move to a position corresponding to the target opening degree, and the vehicle is thereby automatically operated to run at the preset vehicle speed selected at the selecting portion 64.

According to the above explained third embodiment, the selecting portion 64 of the calculation means 61 selects one of the preset vehicle speeds, which is lower than the other, between the first preset vehicle speed set by the vehicle driver via the vehicle speed setting switch 30 and the second vehicle speed outputted from the ACC module 32, and the calculation means 61 calculates the demand vehicle driving power based on the selected vehicle speed in order to control the opening degree of the throttle valve. Accordingly, the same effect to the first embodiment can be obtained in the third embodiment.

Fourth Embodiment

A fourth embodiment of the present invention will be explained with reference to FIGS. 8 and 9. A system structure for an engine control system of the fourth embodiment is the same to that of the first embodiment (FIG. 1).

Figure 8:
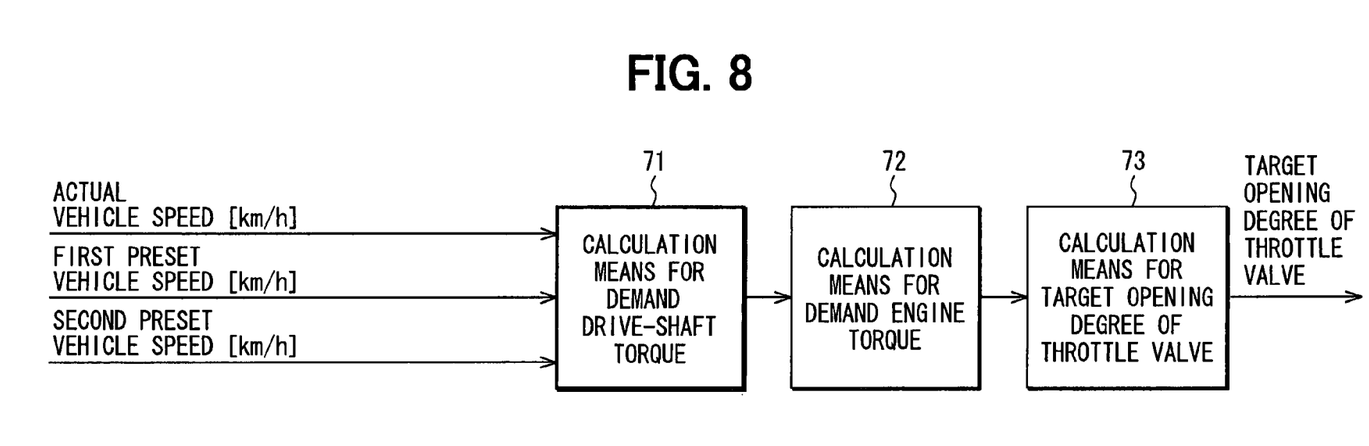
FIG. 8 is a block diagram showing a function of control device for a vehicle automatic running according to a fourth embodiment.

As shown in FIG. 8, the function of the vehicle automatic running control to be performed by the ECU 29 is carried out by a calculation means 71 for a demand drive-shaft torque, a calculation means 72 for a demand engine torque, and a calculation means 73 for a target opening degree of the throttle valve.

In addition to the function 71a (shown in FIG. 9) of the calculation means 71 for calculating the demand drive-shaft torque for the automatic running control of the vehicle, the calculation means 71 has another function for calculating a demand drive-shaft torque for a manually operated vehicle running, as in a similar manner to the first embodiment. Namely, the calculation means 71 receives a signal of an opening degree of an acceleration pedal from an acceleration sensor (not shown), and calculates the demand drive-shaft torque for the manually operated vehicle running based on the opening degree of the acceleration pedal. Accordingly, the calculation means 71 also calculates the demand drive-shaft torque for the manually operated vehicle running, based on the opening degree of the acceleration pedal operated by the vehicle driver.

Figure 9:
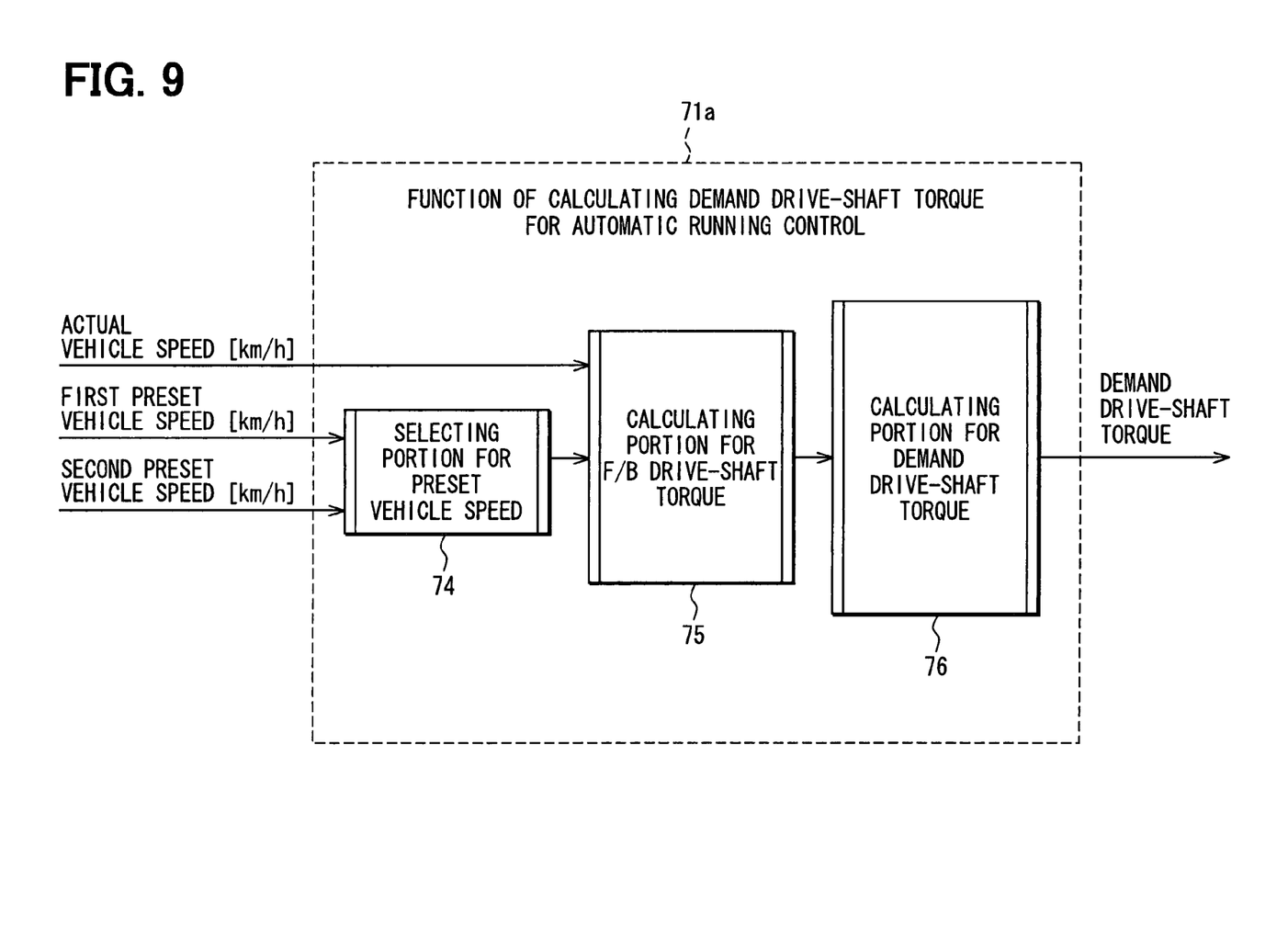
FIG. 9 is a block diagram showing a function for calculating a demand drive-shaft torque according to the fourth embodiment.

As shown in FIG. 9, the function 71a of calculating the demand drive-shaft torque for the automatic running control is carried out by a selecting portion 74 for a preset vehicle speed, a calculating portion 75 for a feed-back drive-shaft torque, and a calculating portion 76 for the demand drive-shaft torque.

The selecting portion 74 for the preset vehicle speed compares the first preset vehicle speed set by the vehicle speed setting switch 30 with the second preset vehicle speed inputted from the ACC module 32, and selects one of the preset vehicle speed which is lower than the other. The calculating portion 75 for the feed-back drive-shaft torque calculates a feed-back correction amount for correcting a drive-shaft torque in a feed-back control in order that the difference between the actual vehicle speed detected by the vehicle speed sensor 31 and the selected vehicle speed selected at the selecting portion 74 will be minimized. The calculating portion 76 for the demand drive-shaft torque calculates the demand drive-shaft torque based on the feed-back correction amount calculated by the calculating portion 75.

The demand drive-shaft torque calculated by the calculation means 71 is inputted to the calculation means 72, at which it is converted into the demand engine torque.

The calculation means 73 calculates the target opening degree of the throttle valve based on the demand engine torque calculated at the calculation means 72, and outputs a control signal to a driving circuit (not shown) for the motor 15 of the electronic throttle control system. As a result, an actual opening degree of the throttle valve 16 is controlled by the motor 15 to move to a position corresponding to the target opening degree, and the vehicle is thereby automatically operated to run at the preset vehicle speed selected at the selecting portion 74.

According to the above explained third embodiment, the selecting portion 74 of the calculation means 71 selects one of the preset vehicle speeds, which is lower than the other, between the first preset vehicle speed set by the vehicle driver via the vehicle speed setting switch 30 and the second vehicle speed outputted from the ACC module 32, and the calculation means 71 calculates the demand drive-shaft torque based on the selected vehicle speed in order to control the opening degree of the throttle valve. Accordingly, the same effect to the first embodiment can be obtained in the fourth embodiment.

Fifth Embodiment

Figure 10:
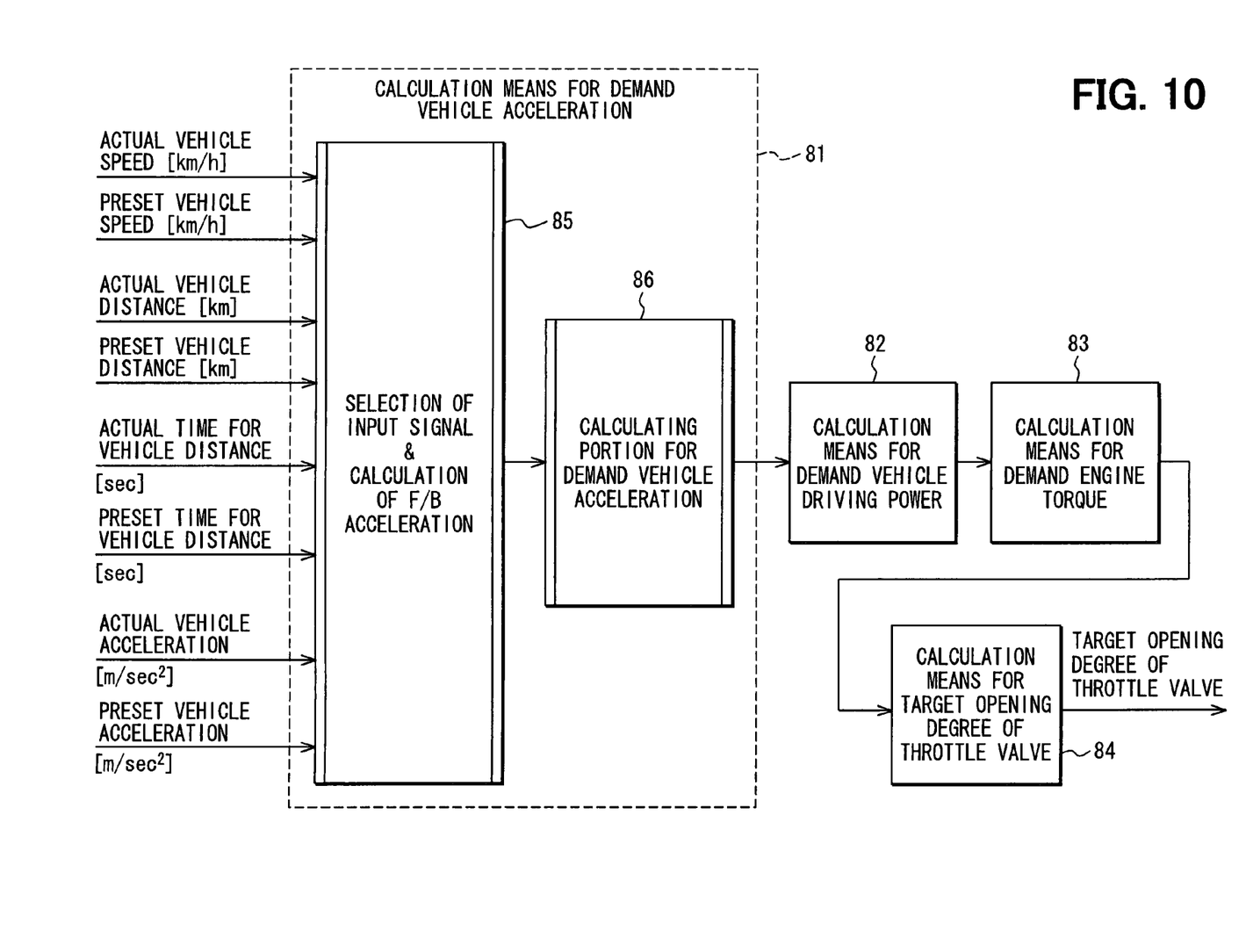
FIG. 10 is a block diagram showing a function of control device for a vehicle automatic running according to a fifth embodiment.

A fifth embodiment of the present invention will be explained with reference to FIG. 10. A system structure for an engine control system of the fifth embodiment is the same to that of the first embodiment (FIG. 1).

The function of the vehicle automatic running control to be performed by the ECU 29 is carried out by a calculation means 81 for a demand vehicle acceleration, a calculation means 82 for a demand vehicle driving power, a calculation means 83 for a demand engine torque, and a calculation means 84 for a target opening degree of the throttle valve.

The calculation means 81 for the demand vehicle acceleration has an input processing portion 85 and a calculating portion 86 for a demand vehicle acceleration. The input processing portion 85 has a function for selecting input signals and a function for calculating a feed-back vehicle acceleration.

When an external module is provided to the ECU 29, in order to input into the ECU 29 any one of information among a preset vehicle speed, a preset vehicle distance, a preset time for vehicle distance, and a preset vehicle acceleration, the input processing portion 85 determines which information is inputted to the ECU 29. Then, the input processing portion 85 calculates a feed-back correction amount for correcting a vehicle acceleration in order that a difference between the inputted information and a detected amount at a corresponding sensor (for example, between the preset vehicle speed and an actual vehicle speed detected by a vehicle speed sensor) will be minimized.

The calculating portion 86 calculates the demand vehicle acceleration based on the feed-back correction amount calculated by the input processing portion 85.

The demand vehicle acceleration calculated by the calculation means 81 is inputted to the calculation means 82, at which it is converted into the demand vehicle driving power. The demand vehicle driving power is then inputted to the calculation means 83, at which it is converted into the demand engine torque.

The calculation means 84 calculates the target opening degree of the throttle valve based on the demand engine torque calculated at the calculation means 83, and outputs a control signal to a driving circuit (not shown) for the motor 15 of the electronic throttle control system. As a result, an actual opening degree of the throttle valve 16 is controlled by the motor 15 to move to a position corresponding to the target opening degree, and the vehicle is thereby automatically operated to run in such a manner that the difference between the inputted information and the detected amount at the corresponding sensor (for example, between the preset vehicle speed and the actual vehicle speed detected by the vehicle speed sensor) will be minimized.

According to the above embodiment, the external module for outputting any one of information, among the preset vehicle speed, the preset vehicle distance, the preset time for vehicle distance, and the preset vehicle acceleration, can be added to the electronic throttle system. This increases a design flexibility of the electronic throttle system.

Sixth Embodiment

Figure 11:
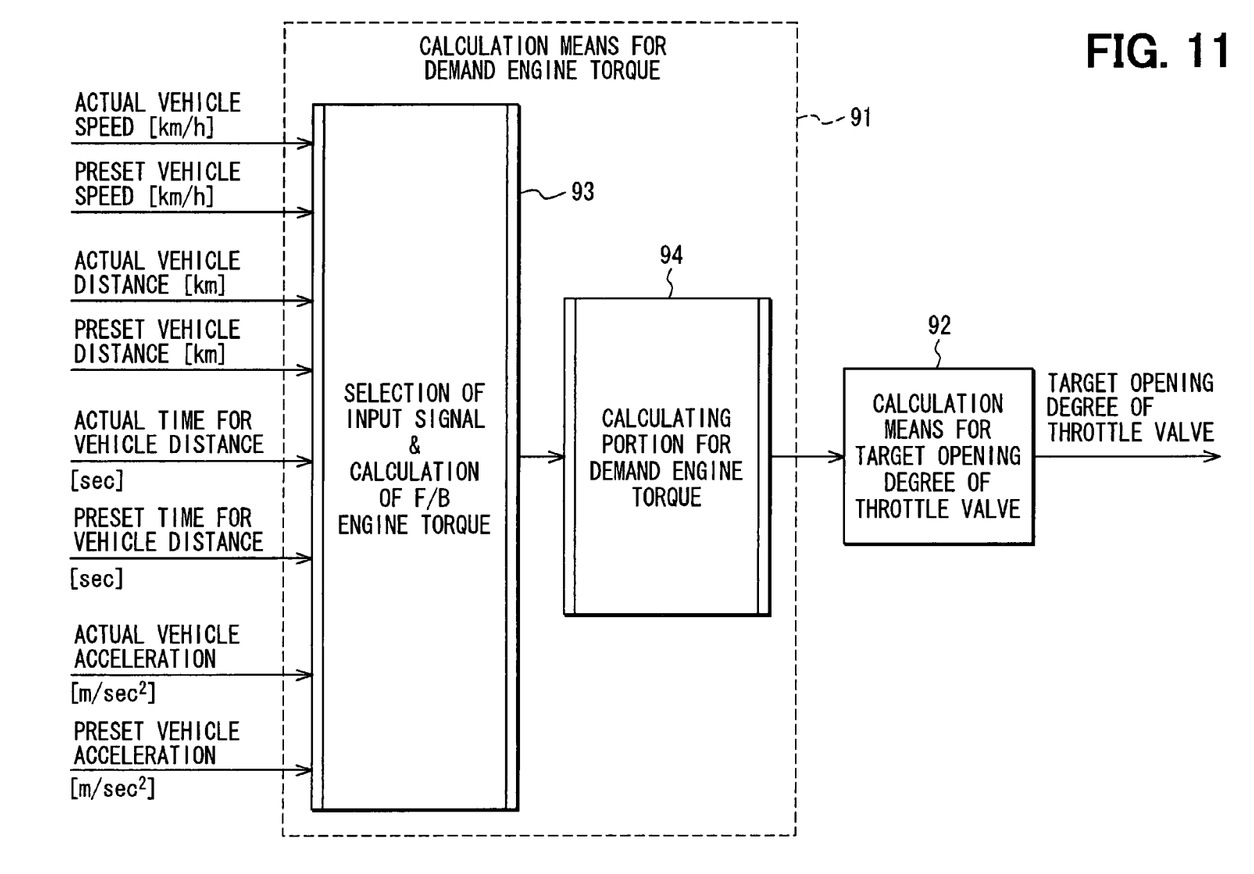
FIG. 11 is a block diagram showing a function of control device for a vehicle automatic running according to a sixth embodiment.

A sixth embodiment of the present invention will be explained with reference to FIG. 11. A system structure for an engine control system of the sixth embodiment is the same to that of the first embodiment (FIG. 1).

In the sixth embodiment, the function of the vehicle automatic running control to be performed by the ECU 29 is carried out by a calculation means 91 for a demand engine torque, and a calculation means 92 for a target opening degree of the throttle valve.

The calculation means 91 for the demand engine torque has an input processing portion 93 and a calculating portion 94 for a demand engine torque. The input processing portion 93 has a function for selecting input signals and a function for calculating a feed-back engine torque.

As in the same manner to the fifth embodiment, when an external module is provided to the ECU 29, in order to input into the ECU 29 any one of information among a preset vehicle speed, a preset vehicle distance, a preset time for vehicle distance, and a preset vehicle acceleration, the input processing portion 93 determines which information is inputted to the ECU 29. Then, the input processing portion 93 calculates a feed-back correction amount for correcting the engine torque in order that a difference between the inputted information and a detected amount at a corresponding sensor (for example, between the preset vehicle speed and an actual vehicle speed detected by a vehicle speed sensor) will be minimized.

The calculating portion 94 calculates the demand engine torque based on the feed-back correction amount calculated by the input processing portion 93.

In addition to the function for calculating the demand engine torque for the automatic running control of the vehicle, the calculation means 91 has a further function for calculating a demand engine torque for a manually operated vehicle running based on an opening degree of an acceleration pedal, which is detected by an acceleration sensor (not shown). Accordingly, the calculation means 91 calculates the demand engine torque for the manually operated vehicle running, based on the opening degree of the acceleration pedal operated by the vehicle driver.

The calculation means 92 calculates the target opening degree of the throttle valve based on the demand engine torque calculated at the calculation means 91, and outputs a control signal to a driving circuit (not shown) for the motor 15 of the electronic throttle control system. As a result, an actual opening degree of the throttle valve 16 is controlled by the motor 15 to move to a position corresponding to the target opening degree, and the vehicle is thereby automatically operated to run in such a manner that the difference between the inputted information and the detected amount at the corresponding sensor (for example, between the preset vehicle speed and the actual vehicle speed detected by the vehicle speed sensor) will be minimized.

According to the above embodiment, the external module for outputting any one of information, among the preset vehicle speed, the preset vehicle distance, the preset time for vehicle distance, and the preset vehicle acceleration, can be also added to the electronic throttle system. This increases a design flexibility of the electronic throttle system.

Seventh Embodiment

Figure 12:
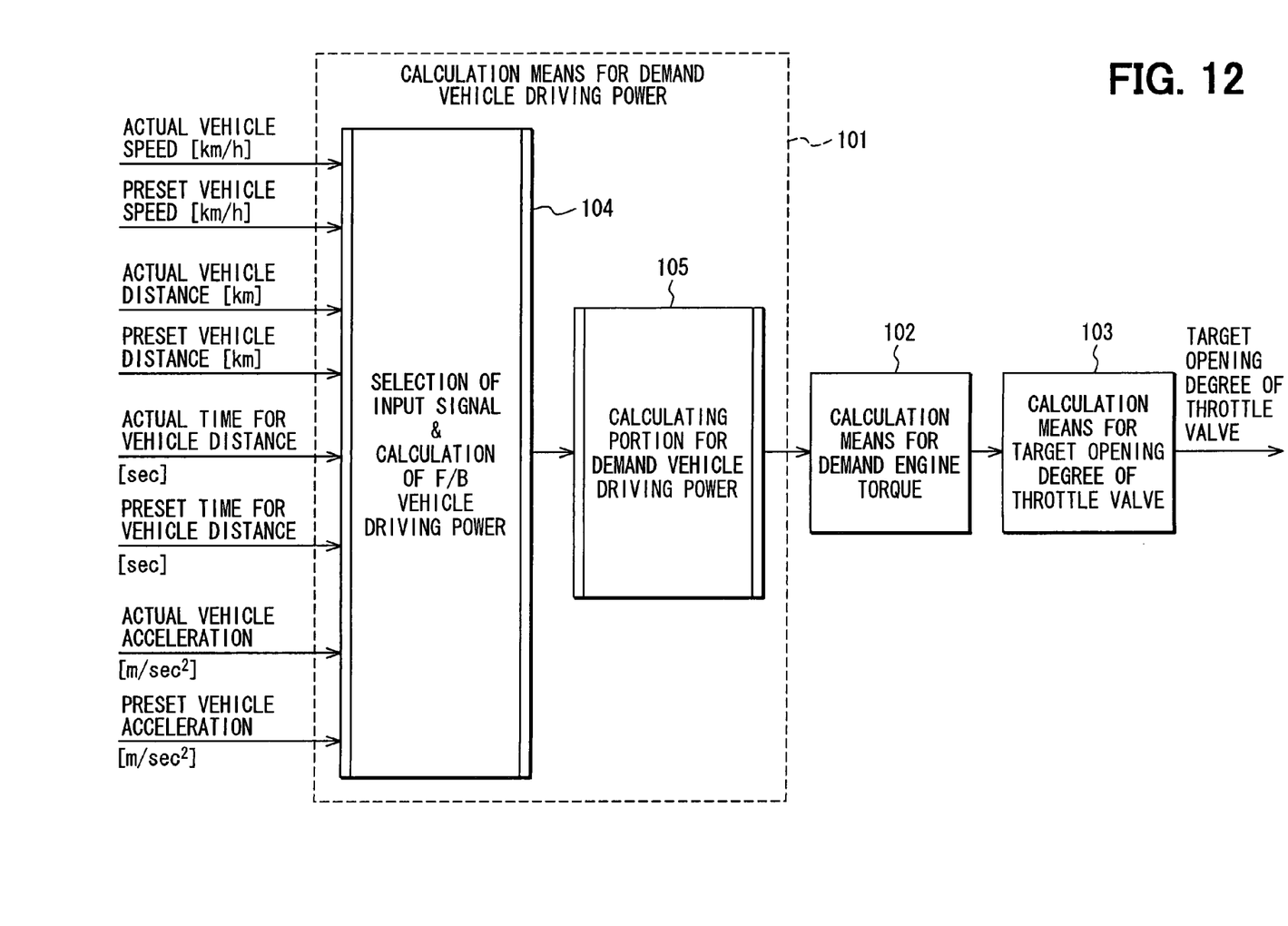
FIG. 12 is a block diagram showing a function of control device for a vehicle automatic running according to a seventh embodiment.

A seventh embodiment of the present invention will be explained with reference to FIG. 12. A system structure for an engine control system of the seventh embodiment is the same to that of the first embodiment (FIG. 1).

In the seventh embodiment, the function of the vehicle automatic running control to be performed by the ECU 29 is carried out by a calculation means 101 for a demand vehicle driving power, a calculation means 102 for a demand engine torque, and a calculation means 103 for a target opening degree of the throttle valve.

The calculation means 101 has an input processing portion 104 and a calculating portion 105 for a demand vehicle driving power. The input processing portion 104 has a function for selecting input signals and a function for calculating a feed-back vehicle driving power.

Also as in the same manner to the above fifth or sixth embodiment, when an external module is provided to the ECU 29, in order to input into the ECU 29 any one of information among a preset vehicle speed, a preset vehicle distance, a preset time for vehicle distance, and a preset vehicle acceleration, the input processing portion 104 determines which information is inputted to the ECU 29. Then, the input processing portion 104 calculates a feed-back correction amount for correcting the vehicle driving power in order that a difference between the inputted information and a detected amount at a corresponding sensor (for example, between the preset vehicle speed and an actual vehicle speed detected by a vehicle speed sensor) will be minimized.

The calculating portion 105 calculates the demand vehicle driving power based on the feed-back correction amount calculated by the input processing portion 104.

In addition to the function for calculating the demand vehicle driving power for the automatic running control of the vehicle, the calculation means 101 has a further function for calculating a demand vehicle driving power for a manually operated vehicle running based on an opening degree of an acceleration pedal, which is detected by an acceleration sensor (not shown). Accordingly, the calculation means 101 cal-culates the demand vehicle driving power for the manually operated vehicle running, based on the opening degree of the acceleration pedal operated by the vehicle driver.

The demand vehicle driving power calculated by the calculation means 101 is inputted to the calculation means 102, at which it is converted into the demand engine torque.

The calculation means 103 calculates the target opening degree of the throttle valve based on the demand engine torque calculated at the calculation means 102, and outputs a control signal to a driving circuit (not shown) for the motor 15 of the electronic throttle control system. As a result, an actual opening degree of the throttle valve 16 is controlled by the motor 15 to move to a position corresponding to the target opening degree, and the vehicle is thereby automatically operated to run in such a manner that the difference between the inputted information and the detected amount at the corresponding sensor (for example, between the preset vehicle speed and the actual vehicle speed detected by the vehicle speed sensor) will be minimized.

According to the above embodiment, the external module for outputting any one of information, among the preset vehicle speed, the preset vehicle distance, the preset time for vehicle distance, and the preset vehicle acceleration, can be also added to the electronic throttle system. This increases likewise a design flexibility of the electronic throttle system.

Eighth Embodiment

Figure 13:
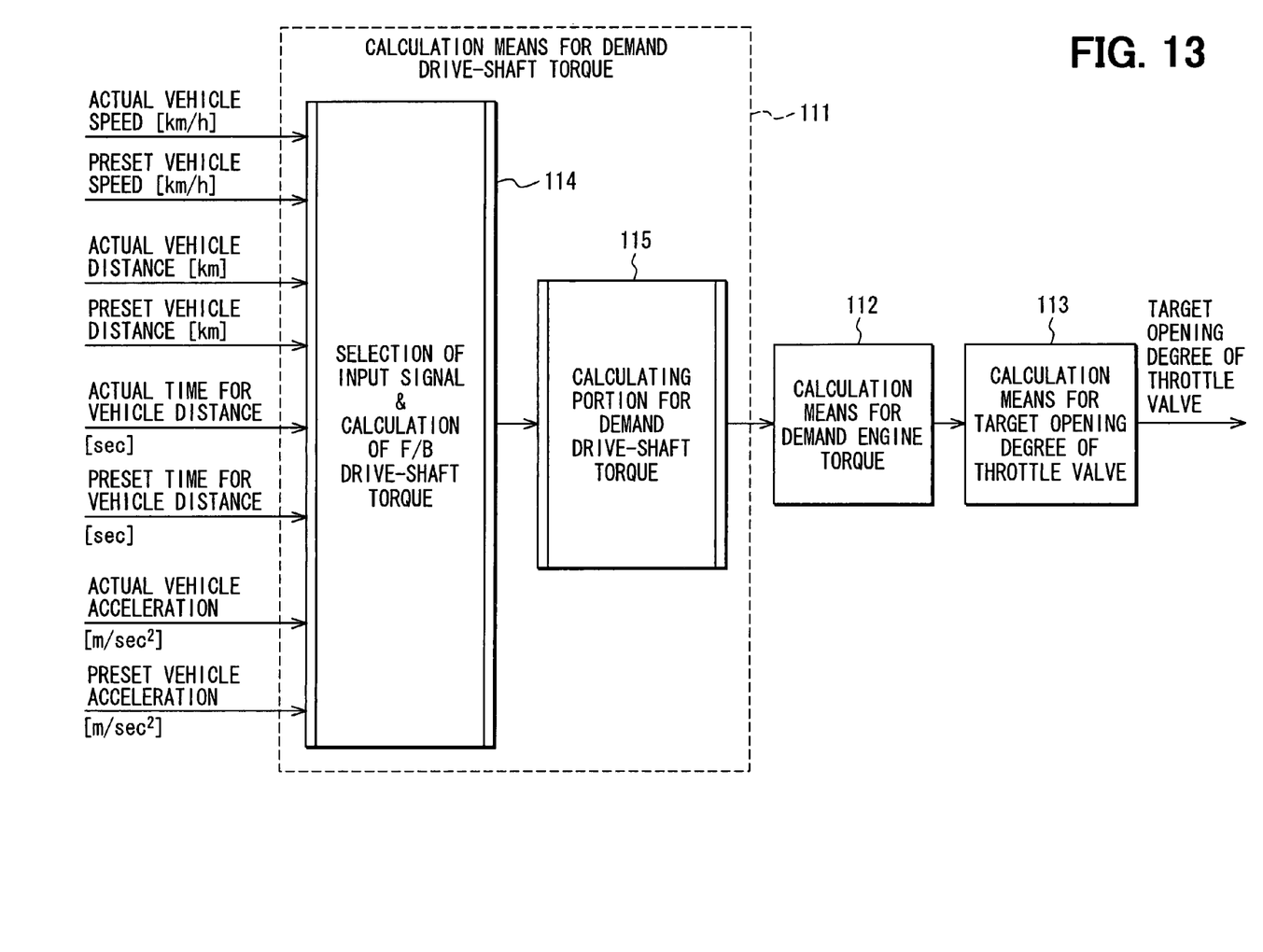
FIG. 13 is a block diagram showing a function of control device for a vehicle automatic running according to an eighth embodiment.

An eighth embodiment of the present invention will be explained with reference to FIG. 13. A system structure for an engine control system of the eighth embodiment is the same to that of the first embodiment (FIG. 1).

In the eighth embodiment, the function of the vehicle automatic running control to be performed by the ECU 29 is carried out by a calculation means 111 for a demand vehicle drive-shaft torque, a calculation means 112 for a demand engine torque, and a calculation means 113 for a target opening degree of the throttle valve.

The calculation means 111 has an input processing portion 114 and a calculating portion 115 for a demand drive-shaft torque. The input processing portion 114 has a function for selecting input signals and a function for calculating a feed-back drive-shaft torque.

Also as in the same manner to the above fifth to seventh embodiments, when an external module is provided to the ECU 29, in order to input into the ECU 29 any one of information among a preset vehicle speed, a preset vehicle distance, a preset time for vehicle distance, and a preset vehicle acceleration, the input processing portion 114 determines which information is inputted to the ECU 29. Then, the input processing portion 114 calculates a feed-back correction amount for correcting the drive-shaft torque in order that a difference between the inputted information and a detected amount at a corresponding sensor (for example, between the preset vehicle speed and an actual vehicle speed detected by a vehicle speed sensor) will be minimized.

The calculating portion 115 calculates the demand drive-shaft torque based on the feed-back correction amount calculated by the input processing portion 114.

In addition to the function for calculating the demand drive-shaft torque for the automatic running control of the vehicle, the calculation means 111 has a further function for calculating a demand drive-shaft torque for a manually operated vehicle running based on an opening degree of an acceleration pedal, which is detected by an acceleration sensor (not shown). Accordingly, the calculation means 111 calculates the demand drive-shaft torque for the manually operated vehicle running, based on the opening degree of the acceleration pedal operated by the vehicle driver.

The demand drive-shaft torque calculated by the calculation means 111 is inputted to the calculation means 112, at which it is converted into the demand engine torque.

The calculation means 113 calculates the target opening degree of the throttle valve based on the demand engine torque calculated at the calculation means 112, and outputs a control signal to a driving circuit (not shown) for the motor 15 of the electronic throttle control system. As a result, an actual opening degree of the throttle valve 16 is controlled by the motor 15 to move to a position corresponding to the target opening degree, and the vehicle is thereby automatically operated to run in such a manner that the difference between the inputted information and the detected amount at the corresponding sensor (for example, between the preset vehicle speed and the actual vehicle speed detected by the vehicle speed sensor) will be minimized.

According to the above embodiment, the external module for outputting any one of information, among the preset vehicle speed, the preset vehicle distance, the preset time for vehicle distance, and the preset vehicle acceleration, can be also added to the electronic throttle system. This increases likewise a design flexibility of the electronic throttle system.

What is claimed is:

1. A control device for a vehicle automatic running control comprising:
    an electronic throttle control system for a vehicle having,
    a vehicle speed sensor for detecting an actual running speed of the vehicle,
    a vehicle speed setting switch for setting a first preset vehicle speed,
    an electrical driving device for operating a throttle valve, and
    an electronic control unit for controlling an opening degree of the throttle valve by operating the electrical driving device in accordance with a signal from the vehicle speed setting switch, so that the vehicle runs at the first preset vehicle speed set by a vehicle driver; and
    an external module for outputting a signal for a second preset vehicle speed depending on a vehicle running condition;
    wherein the electronic control unit comprises:
    a speed selecting portion for selecting one of the first and second preset vehicle speeds, which is smaller than the other;
    a calculating portion for calculating a feed-back amount of a vehicle acceleration based on the preset vehicle speed selected at the speed selecting portion as well as the actual running speed of the vehicle;
    a calculating portion for calculating a demand vehicle acceleration based on the feed-back amount of the vehicle acceleration;
    a calculating portion for calculating a demand vehicle driving power based on the demand vehicle acceleration;
    a calculating portion for calculating a demand engine torque based on the demand vehicle driving power; and
    a calculating portion for calculating a target opening degree of the throttle valve based on the demand engine torque, so that the throttle valve is actuated to move to a position corresponding to the target opening degree.

* * * * *